United States Patent
Hurlburt et al.

[11] 3,722,296
[45] Mar. 27, 1973

[54] ANTIFRICTION BEARING WITH COMPENSATING FLEXURAL PIVOT IN A FREE AXIS GYROSCOPE

[75] Inventors: Charles E. Hurlburt, River Edge; Michael J. Lanni, Ridgewood, both of N.J.

[73] Assignee: The Bendix Corporation, Teterboro, N.J.

[22] Filed: Jan. 19, 1971

[21] Appl. No.: 107,761

[52] U.S. Cl. ........................................74/5, 308/2 A
[51] Int. Cl. ..............................................G01c 19/18
[58] Field of Search ....308/2 A; 74/5; 64/11 R, 15 B, 64/27 B

[56] References Cited

UNITED STATES PATENTS

| | | | |
|---|---|---|---|
| 2,771,778 | 11/1956 | Ryberg | 74/5 |
| 3,073,584 | 1/1963 | Troeger | 308/2 A X |
| 3,277,555 | 10/1966 | Kutash | 308/2 A X |
| 3,264,880 | 8/1966 | Fischel | 74/5 |
| 3,301,073 | 1/1967 | Howe | 74/5 X |

*Primary Examiner*—Manuel A. Antonakas
*Attorney*—Herbert L. Davis and Plante, Hartz, Smith & Thompson

[57] ABSTRACT

An antifriction bearing with compensating flexure pivot, including a shaft supporting a load and mounted in a suitable ball bearing arrangement with a flexural pivot device operatively connected in the shaft intermediate the load and the bearing so as to provide a free axis of a gyroscope. Thus one operative part of the flexural pivot is secured with an inner race of the bearing so as to permit large angular freedom of movement of one gimbal of the gyroscope relative to another gimbal of the gyroscope about the free axis provided by attaching the other operative part of the flexural pivot to one gimbal of the gyroscope, and an outer race of the bearing arrangement to the other gimbal of the gyroscope so that the deflection of the flexural pivot may in effect be always kept nearly at null so that torque transmitted to the load due to friction at the bearing may be considered of a negligible effect and the bearing substantially frictionless.

6 Claims, 2 Drawing Figures

PATENTED MAR 27 1973    3,722,296

INVENTORS
CHARLES E. HURLBURT
MICHAEL J. LANNI
BY Herbert L. Davis
ATTORNEY

ANTIFRICTION BEARING WITH COMPENSATING FLEXURAL PIVOT IN A FREE AXIS GYROSCOPE

BACKGROUND OF THE INVENTION

1. Field of the Invention

This invention relates to a bearing arrangement to reduce undesirable torques in certain types of rotary supports, and more particularly, to an antifriction bearing with a compensating arrangement for a flexural pivot to reduce undesirable torques in certain types of rotary supports, which may be due to bearing friction and a device which would be particularly useful as a support in a low friction application such as a gyroscope.

2. Description of the Prior Art

Heretofore, complex mechanism has been provided to compensate for the restraining torque affected by flexure pivots utilized in gyroscopes in place of ball bearings for the precession or gimbal axis of the gyroscope, as disclosed and claimed in a U. S. Pat. No. 3,264,880, granted Aug. 9, 1966, to Eduard M. Fischel. The disclosure of the patent is directed particularly to a means for compensating for torques developed in a gyroscopic apparatus by flexural pivots so as to provide through the operation of the compensating means frictionless bearings for rotary shafts in the gyroscope and thus minimize or eliminate undesirable torques introduced in the system by flexural pivots, but the disclosure of the patent fails to suggest the combination of a flexural pivot with a ball bearing assembly to decrease the flexure of the pivot, as in the present invention.

Furthermore, U. S. Pat. No. 3,048,044, granted Aug. 7, 1962, to Paul R. Adams et al, involves a very complex system and a sensing means in which a vertical support wire of the disclosed arrangement must not only sense a relatively minute strain caused by friction torques of a rotary support, but also a strain caused by the weight of a gimbal of a gyroscope and involves the measurement of minute variations in a relatively large voltage output of the sensor and a distinctly different idea of means from that of the simplified structural arrangement of the present invention.

U. S. Pat. No. 2,928,281, granted Mar. 15, 1960, to Steven L. Burgwin et al, U. S. Pat. No. 3,082,629, granted Mar. 26, 1963, to Arthur B. Jones, Jr., et al, and U. S. Pat. No. 3,534,616, granted Oct. 20, 1970, to Thomas E. O'Connor, are of general interest in showing various means of producing frictionless bearings to eliminate undesirable torques mechanically in such gyroscopic apparatus. Thus the disclosure of U. S. Pat. No. 2,928,281 accomplishes the result sought in a somewhat different manner by the summation of the bearing compliances; the disclosure of U. S. Pat. No. 3,082,629 accomplishes the frictionless feature by effecting a reverse rotation of the bearing parts; while the disclosure of U. S. Pat. No. 3,534,616 provides a transducer and torquer motor to decrease the deflection of the flexural pivot.

There has been further noted a U. S. Pat. No. 3,059,343, granted Oct. 23, 1962, to David W. Kermode, as of interest in defining an electrical method of nullifying starting torques by rotatably oscillating the bearings of a shaft support in a gyroscope.

Moreover, while U. S. Pat. No. 3,132,315, granted May 5, 1964 to F. Henry S. Rossire discloses at FIG. 3 thereof a ball or journal bearing and a flexural pivot the arrangement is such that the flexural pivot and ball bearing structure are alternately rendered effective upon energization and deenergization of a controlling electromagnet, rather than the flexural pivot and ball bearing arrangement being jointly effective to provide the combined compensating action of the present invention.

U. S. Pat. No. 3,132,315 and U. S. Pat. No. 3,534,616 have both been assigned to The Bendix Corporation, assignee of the present invention.

Further there has been noted a U. S. Pat. No. 3,365,960, granted Jan. 30, 1968, to Elliott J. Siff and Irving Schaffer, wherein a support shaft 18 has a flexural portion located within a central diameter and axis of a set of ball bearing races. Also there have been noted of interest U. S. Pat. No. 2,771,778, granted Nov. 27, 1956, to Arling W. Ryberg; U. S. Pat. No. 2,995,938, granted Aug. 15, 1961, to Rolf K. Broderson and Fred D. Litty; and U. S. Pat. No. 3,301,073, granted Jan. 31, 1967, to Edwin W. Howe, inasmuch as these patents disclose a gyroscope having a flexural pivot support in combination with ball bearings, but none of the patents aforenoted suggest the specific structural arrangement of flexural pivots in combination with anti friction bearings to effect the desired minimum friction with large angular freedom about free axes of a gyroscope.

Such flexural pivot and bearing combination of the present invention, moreover, is so arranged as to permit a relatively large angular freedom of motion of the gimbals of the gyroscope, in that one operative part of the flexural pivot is mated with the inner race of the anti friction bearing while an opposite operative part of the flexural pivot is attached to one gimbal structure and the outer race of the anti friction bearing is mounted in another gimbal structure of the gyroscope. Thus effective operative forces may be applied through the one gimbal structure to said opposite operative part of the flexural pivot attached thereto while the pivotal movement of said one gimbal relative to said other gimbal in response to said applied forces may be permitted through the flexural pivot and anti friction ball bearing arrangement with the flexural pivot providing effectively zero friction and the anti friction bearing preventing high torques from developing under large angular displacement operating conditions of the respective gimbals of the gyroscope.

Heretofore low friction levels in a rotary bearing support were obtained by means of exotic designs such as rotating race bearings or fluid bearings while the present invention permits the use of a less critical type of rotary support such as ball or journal bearings in combination with a flexural pivot.

There is no suggestion in the disclosures of the aforenoted patents of the simplified torque compensating means herein provided of a flexure pivot combined in a load bearing rotary shaft supported in a roller bearing assembly as in the present invention.

The present invention resides in a concept which simplifies complex mechanisms and reduces the number of necessary parts, while at the same time raising the percent of durability and certainty of operation so as to effect a condition of greater durability and one which is more sure to produce practically the same result and not only with greater certainty, but with less expense.

SUMMARY OF THE INVENTION

An object of the present invention is to provide a simplified device to greatly reduce undesirable torques in certain types of rotary supports, and particularly, torques due to bearing friction.

Another object of the invention is to provide a device of simplified structure to reduce undesirable torques in bearing friction of rotary supports in a low friction application such as a gyroscope.

Another object of the invention is to provide means to reduce undesirable torques in less critical type rotary supports such as ball or journal bearings through the use of a flexural pivot device and bearing means responsive to the flexure of the pivot device to decrease the deflection of the flexure pivot in a sense to keep the deflection of the flexure pivot nearly at null so that torques transmitted thereby to the load may be considered negligible and the bearing effectively frictionless.

It has been heretofore considered that one of the limitations upon a gyroscope, which limits is approach to a perfect gyroscope has been the friction on the free axes of the gyroscope. Accordingly the use of flexural pivots, as zero friction devices, has not been made available for gyroscopes that have pivots with large angular freedom because such angular motion, with flexural pivots, would result in completely unacceptable torque levels from the spring. Therefore a further object of the present invention is to combine in the free axes of such a gyroscope a flexural pivot with a ball bearing arrangement to provide such desirable minimum torque levels of operation of the bearing.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts:

Referring to FIG. 1, there is indicated generally by the numeral 10 an antifriction flexural pivot bearing of a type embodied in the present invention and including a flexural pivot device 12 of a cantilever-type and an antifriction bearing 14 of a conventional ball bearing type. The flexural pivot device 12 may be of a type such as disclosed and claimed in a U. S. Pat. No. 3,073,584 granted Jan. 15, 1963 to Henry Troeger and assigned to The Bendix Corporation. The flexural pivot device 12 is designed to carry high radial and axial loads, but has extremely low torsional stiffness in the angular flexure of operative parts 16 and 18 of the flexural pivot device 12 relative one to the other.

Figure 1:
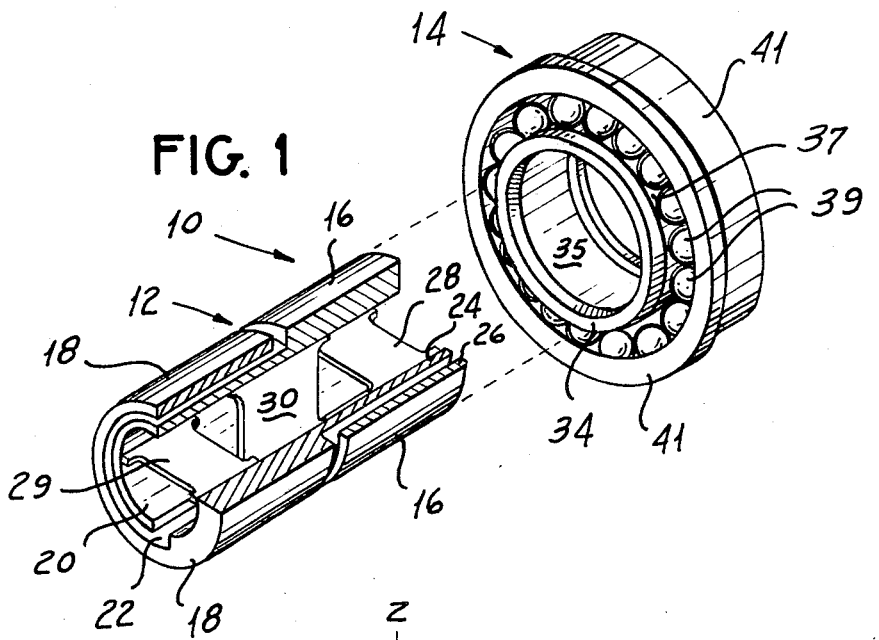
FIG. 1 is a broken-away isometric view of an antifriction flexural pivot bearing of a type embodied in the present invention and including a flexural pivot device of a cantilever-type having an operative part in mating relation with an inner race of an antifriction bearing of a ball bearing type and in which there is shown an internal structure of the flexural pivot device including cross springs connecting two axially-aligned tubular members providing operative parts of the flexural pivot device whereby relative rotation can be made with flexure of the springs.

The operative part 16 of the flexural pivot device 12 comprises at one end of the flexural pivot device 12 an outer tubular sleeve having a segmental tubular sleeve portion 20 which projects in slidable relation into an arcuate recess 22 formed in an inner surface of the operative part 18 of the flexural pivot device 12. The arcuate recess 22 permits limited angular movement of the inner tubular sleeve portion 20 therein relative to the operative part 18.

The operative part 18 in turn comprises at the opposite end of the flexural pivot device 12 an outer tubular sleeve having a segmental tubular sleeve portion 24 which projects in slidable relation into an arcuate recess 26 formed in an inner surface of the operative part 16. The arcuate recess 26 in turn permits limited angular movement of the inner sleeve portion 24 therein relative to the operative part 16.

There are further provided a pair of flat steel springs 28 and 29 extending in a parallel spaced relation in which the flat steel spring 28 is securely bonded at one end to an inner surface of the operative part 16 and at an opposite end to an inner surface of the inner tubular sleeve portion 24 which projects from the opposite operative part 18 into the arcuate recess 26 formed in the inner surface of the operative part 16, while the flat steel spring 29 is securely bonded at one end to an inner surface of the operative part 18 and at an opposite end to an inner surface of the inner tubular sleeve portion 20 which projects from the opposite operative part 16 into the arcuate recess 22 formed in the inner surface of the operative part 18.

Furthermore, as shown by FIG. 1, a third flat steel spring 30 extends between the flat steel springs 28 and 29 and in an orthogonal crossed spring relation to the flat steel springs 28 and 29. The flat steel spring 30 is securely bonded at one end to the inner surfaces of the operative part 16 and the tubular sleeve portion 20 projecting from the operative part 16, while the opposite end of the flat steel spring 30 is securely bonded to the inner surfaces of the operative part 18 and the tubular sleeve portion 24 projecting therefrom.

In the flexural pivot device 12, the tubular sleeve portion 20 projecting from the operative part 16 into the operative part 18 and the tubular sleeve portion 24 projecting from the opposite operative part 18 into the operative part 16 are so arranged as to carry relatively high radial and axial loads applied to the flexural pivot device 12.

However, as shown in FIG. 1, the flat steel springs including the flat steel springs 28 and 29 extending in crossed relation to the flat steel spring 30, normally bias the segmental tubular sleeve portions 20 and 24 into an arcuate null position intermediately disposed in equal spaced relation from the limiting end portions of the respective recesses 22 and 26 in the operative parts 18 and 16. The flat steel springs 28, 29 and 30 are so selected as to provide an extremely low torsional stiffness in opposition to the angular flexure of the operative part 18 relative to the operative part 16 and a torsional stiffness which is less than that of the frictional forces applied at the bearing assembly 14 in opposition to angular flexure of the operative part 16 within the limited range of angular movement of the operative part 18 relative to the part 16 permitted by the arcuate recesses 22 and 26. Thus there is provided within such limited range an effective zero friction device. However angular movement oh the part 18 relative to the part 16 in excess of such limited range effects a direct driving connection between the operative part 18 and the part 16 pivotally mounted in the antifriction bearing 14, as hereinafter explained. The use of such flexural pivots, as effective zero friction devices, has not, heretofore been made available for gyroscopes requiring pivots providing large angular freedom, because such angular motion, with such flexural pivots, would result in completely unacceptable torque levels from the springs.

However in the present invention, these unacceptable torque levels are effectively avoided by the connection of the one operative part 16 of the flexural pivot with the inner race 37 of the antifriction bearing 14 which may be of a conventional ball bearing type.

Thus the outer surface of the operative part 16 of the flexural pivot device 12, as indicated by FIG. 1, is mated in a cup shaped receptacle 34 and secured by a press fit or suitable bonding means to the inner surface 35 of the receptacle 34. The cup shaped receptacle 34 is in turn suitably secured in the inner race 37 of the antifriction bearing 14 which may be of a conventional type having ball bearings 39 carried between the inner race 37 and an outer race 41 of the antifriction bearing 14.

In the form of the invention illustrated by FIG. 2, the antifriction flexural pivot bearing 10 of FIG. 1 is shown applied to a gyroscope in which corresponding numerals indicate corresponding parts to those heretofore described with reference to FIG. 1. However, in the aforenoted gyroscope, there is shown a gyro rotor 100 of conventional type rotatably mounted on a spin axis 101 in a gimbal 102 and driven by conventional means not shown.

Figure 2:
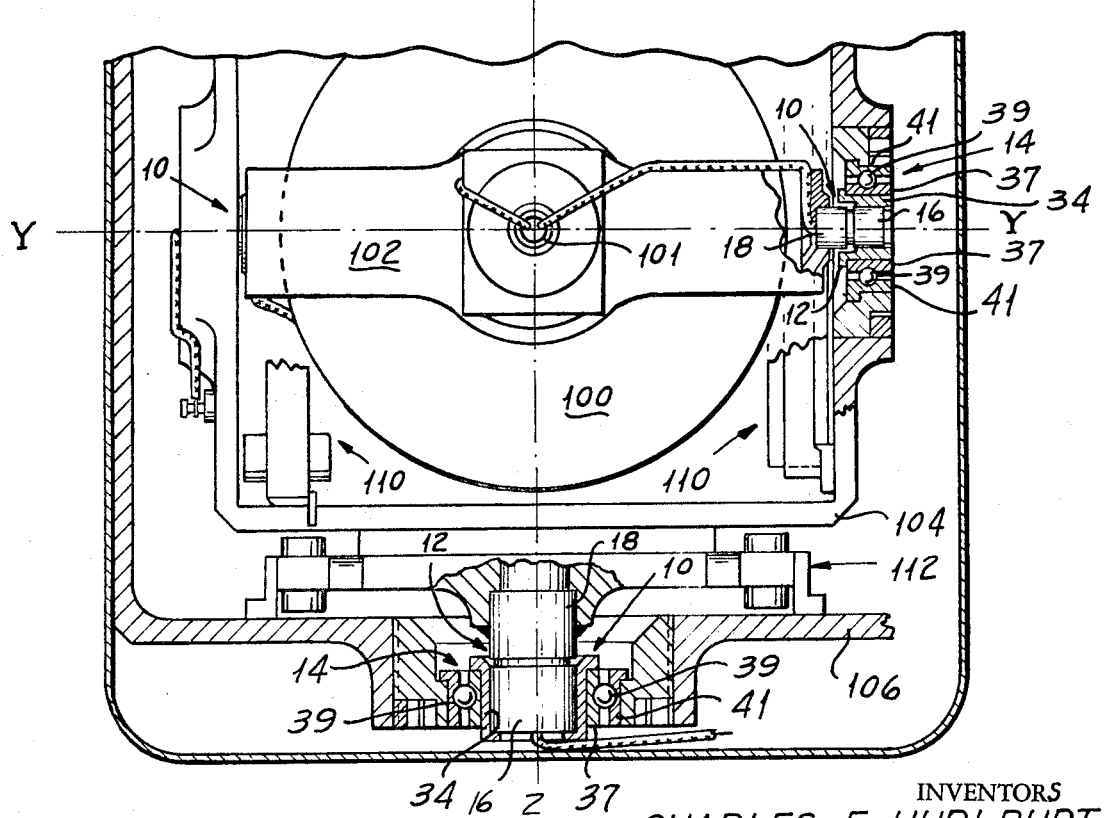
FIG. 2 is a fragmentary plan view partly in section of a gimbal assembly of a gyroscope embodying the present invention and showing in the orthogonal free axes of gimbals of the assembly and at opposite ends of the respective axes of the gimbals the antifriction flexural pivot bearing of FIG. 1.

The gimbal 102 is in turn pivotally mounted on an axis Y—Y extending perpendicular to the spin axis 101 and defined by flexural pivot devices 12 including operating parts 16 mounted in the ball bearing assemblies 14 carried by a second gimbal 104 which may be pivotally mounted, as shown in FIG. 2, on an axis Z—Z extending perpendicularly to axis Y—Y.

The axis Z—Z may be defined, by flexural pivot devices, such as shown by FIG. 1 and indicated by the numeral 12, mounted in suitable antifriction bearings 14. One such arrangement is indicated in FIG. 2 and may include an operative part 16 mounted in a ball bearing assembly 14 carried by a frame 106 which may be fixedly mounted in a casing 108 of the gyroscope as shown in FIG. 2.

The frame 106 acts as a housing for the antifriction ball bearing assembly 14 which supports the operative parts 16 and 18 of the flexural pivot device 12 defining the axis Z—Z and in turn support the load or second gimbal 104. Similarly the second gimbal 104 acts as a housing for the antifriction ball bearing assembly 14 and flexural pivot device 12 having the operative parts 16 and 18 defining the axis Y—Y and in turn support the load or gyro rotor gimbal 102.

Further, as shown by FIG. 2, an angularly positioned transducer indicated generally by the numeral 110, and which may be of a conventional type, serves to sense angular deflection of the conventional 102 relative to the gimbal 104 to provide an electrical signal proportional to the angular deflection, while a second angularly positioned transducer indicated generally by the numeral 112, and which may be of a conventional type, serves to sense angular deflection of the gimbal 104 relative to the frame 106 to in turn provide another electrical signal proportional to such angular deflection.

In the structural arrangement of the gyroscope of FIG. 2, the antifriction flexural pivot bearing 10 of FIG. 1 is so arranged that one operative part 16 of the flexural pivot device 12 is mated by the receptacle 34 with the inner race 37 of the ball bearing assembly 14, while the other operative part 18 of the flexural pivot device 12 is attached to one gimbal (102 or 104). Moreover the outer race 41 of the ball bearing assembly 14 is attached to the other gimbal (104 or 106) so that relative angular movement of said one gimbal to the other gimbal (102 to 104 or 104 to 106) may be effected against the extremely low torsional stiffness of the flat steel springs 28, 29 and 30 within the limited operating range permitted by sleeve portions 20 and 24 in the recesses 22 and 26 or alternatively as permitted by the ball bearing assembly 14.

Thus by the foregoing idea of means the smallest angular deflection of the gimbal (102 relative to gimbal 104 or gimbal 104 relative to the frame 106) effects a resultant angular movement of the operative part 18 relative to the operative part 16 which is opposed only by the extremely low torsional stiffness of the flat steel springs 28, 29 and 30. This in turn causes the corresponding sensor 110 or 112 to effect an output electrical signal proportional to said small angular deflection even though the ball bearing assembly 14 be at a high striction point.

However, under operating conditions of the gyroscope requiring a relatively large angular deflection of the gimbal (102 relative to gimbal 104 or the gimbal 104 relative to the frame 106), there may be effected a correspondingly large angular deflection of the operative part 18. Thereupon, the operative part 18 may drivingly engage the segmental sleeve portion 20 projecting from the operative part 16, while the segmental sleeve portion 24 projecting from the operative part 18 may drivingly engage the operative part 16 at the limits of the respective arcuate recesses 22 and 26 provided in the inner surface of the operative parts 18 and 16 so as to drivingly couple the operative part 18 to the operative part 16. Furthermore, the ball assembly 14 permits large angular freedom of movement of the operative part 18, as thereby drivingly coupled to the operative part 16, without being subjected to the high torque which would be inherently in the flexural pivot device 12 were the flexural pivot device alone displaced through such large angular movement of the operative part 18.

Thus the antifriction flexural pivot bearing 10 of FIG. 1, as applied to the gimbal structure of the gyroscope of FIG. 2, provides in the flexural pivot device 12 the advantages of a flexural pivot without the inherent disadvantage heretofore attributed thereto, i.e. in that there may be provided by the antifriction flexural pivot 10, in effect, zero friction for relatively small angular displacements of the gimbal 102 or 104 operatively connected to the part 18 without high torque for relatively large angular displacements of the gimbal 102 or 104 operatively connected to the part 18. Thus there is provided most of the advantages inherent in the ball bearing type antifriction bearing 14 without its disadvantages i.e. large angular freedom of displacement of the operative part 18 without high striction points during normal operation of the gimbal loops of the gyroscope of FIG. 2.

What is claimed is:

1. In a gyroscope of a type including a gimbal angularly movable about a free axis relative to another part of the gyroscope; and a shaft supporting the gimbal for such angular movement about said free axis; wherein the improvement comprises the shaft including a flexural pivot device, a pair of operative elements for said flexural pivot device, said pair of operative elements being arranged in axial alignment, one of said operative elements being connected to said gimbal, bearing means mounted in said other part of the gyroscope for freely supporting the other of said pair of operative elements, said flexural pivot device being connected between said gimbal and the bearing means so as to carry radial and axial loads applied in relation to said free axis, the flexural pivot device including spring means connected between said pair of operative elements, said spring means permitting angular movement of said one operative element relative to said other operative element, said spring means providing a relatively low torsional stiffness to such angular movement of said one operative element over a predetermined small angular range relative to said other operative element, means for drivingly coupling the pair of operative elements upon the angular movement of said one operative element relative to said other operative element exceeding said predetermined small angular range, and said bearing means permitting large angular freedom of movement of the other operative element of the flexural pivot device freely supported by said bearing means.

2. In a gyroscope, the improvement defined by claim 1 in which the spring means connected between the pair of operative elements includes cross flat springs connected between the pair of operative elements and providing a relatively low torsional stiffness in opposition to the angular movement of said one operative element relative to said other operative element over said predetermined small angular range, the means for drivingly coupling the pair of operative elements including at least one segmental tubular sleeve portion projecting axially from one of said pair of operative elements and engageable with the other operative element for drivingly coupling said pair of operative elements upon the angular movement of said one operative element relative to said other operative element exceeding said predetermined angular range, and said bearing means upon said coupling means being rendered effective thereupon permitting large angular freedom of movement of the other operative element of the flexural pivot device supported by said bearing means.

3. In a gyroscope, the improvement defined by claim 1 including the relatively low torsional stiffness provided by said spring means being less than that of the frictional forces applied at the bearing means and acting in opposition to angular flexure of the other operative element upon movement of said one operative element over said predetermined small angular range relative to said other operative element.

4. In a gyroscope, the improvement defined by claim 1 in which the bearing means includes an inner race, an outer race, and a plurality of ball bearings carried between said inner and outer races, said outer race being mounted in said other part of the gyroscope, and said other operative element of the flexural pivot device being secured in said inner race of the bearing means for permitting the large angular freedom of movement of the other operative element upon the coupling means being rendered effective.

5. In a gyroscope, the improvement defined by claim 1 in which the spring means connected between the pair of operative elements includes crossed flat springs connected between the pair of operative elements and providing a relatively low torsional stiffness in opposition to the angular movement of said one operative element relative to said other operative element over said predetermined small angular range, the relatively low torsional stiffness provided by said spring means being less than that of the frictional forces applied at the bearing means and acting in opposition to angular flexure of the other operative element upon movement of said one operative element over said predetermined small angular range relative to said other operative element, the means for drivingly coupling the pair of operative elements including at least one segmental tubular sleeve portion projecting axially from one of said pair of operative elements and engageable with the other operative element for drivingly coupling said pair of operative elements upon the angular movement of said one operative element relative to said other operative element exceeding said predetermined angular range, and said bearing means upon said coupling means being rendered effective thereupon permitting large angular freedom of movement of the other operative element of the flexural pivot device supported by said bearing means.

6. In a gyroscope, the improvement defined by claim 5 in which the bearing means includes an inner race, an outer race, and a plurality of ball bearings carried between said inner and outer races, said outer race being mounted in said other part of the gyroscope, and said other operative element of the flexural pivot device being secured in said inner race of the bearing means for permitting the large angular freedom of movement of the other operative element upon the coupling means being rendered effective.

* * * * *